(12) United States Patent
Patel

(10) Patent No.: US 7,635,119 B1
(45) Date of Patent: Dec. 22, 2009

(54) ADJUSTABLE LEVELING MOUNT

(75) Inventor: Jigarkumar Patel, League City, TX (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/132,909

(22) Filed: Jun. 4, 2008

(51) Int. Cl.
*B23Q 1/25* (2006.01)

(52) U.S. Cl. .......................... 269/73; 269/71

(58) Field of Classification Search .............. 269/75, 269/71, 73, 43, 271, 257
See application file for complete search history.

(56) References Cited

U.S. PATENT DOCUMENTS

| | | | | |
|---|---|---|---|---|
| 2,207,881 A | * | 7/1940 | Hugo | 269/71 |
| 2,488,296 A | * | 11/1949 | Kraus | 269/71 |
| 2,564,566 A | | 8/1951 | Duffy | |
| 2,990,738 A | * | 7/1961 | Zysset | 269/97 |
| 3,107,908 A | | 10/1963 | West | |
| 3,382,565 A | * | 5/1968 | Binkley | 228/227 |
| 4,033,569 A | | 7/1977 | Dunn | |
| 4,106,761 A | | 8/1978 | Peregrina | |
| 4,140,307 A | * | 2/1979 | Dalmau et al. | 269/71 |
| 4,243,212 A | | 1/1981 | Bunyea et al. | |
| 4,400,915 A | | 8/1983 | Arrigoni | |
| 4,564,179 A | * | 1/1986 | Hollingsworth | 269/71 |
| 4,700,584 A | * | 10/1987 | Narishige et al. | 74/490.13 |
| 4,955,593 A | * | 9/1990 | Yang | 269/71 |
| 5,092,572 A | * | 3/1992 | Litwak et al. | 5/600 |
| 5,265,854 A | * | 11/1993 | Whiteford | 269/3 |
| 5,433,356 A | * | 7/1995 | Russell | 224/519 |
| 5,792,267 A | | 8/1998 | Marszal et al. | |
| 5,997,947 A | | 12/1999 | Burns et al. | |
| 6,007,628 A | | 12/1999 | Ittleson et al. | |
| 6,009,916 A | * | 1/2000 | Krumm | 139/54 |
| 6,139,412 A | | 10/2000 | Dwyer | |
| 6,890,248 B2 | | 5/2005 | Whitmarsh et al. | |

* cited by examiner

*Primary Examiner*—Lee D Wilson
(74) *Attorney, Agent, or Firm*—Kinney & Lange, P.A.

(57) ABSTRACT

A leveling system for a workpiece comprises a vise for holding the workpiece and a multimember support structure for positioning the vise. The multimember support structure comprises at least two joints and provides at least five independent degrees of freedom in angular motion for positioning the vise and leveling the workpiece.

25 Claims, 4 Drawing Sheets

ADJUSTABLE LEVELING MOUNT

BACKGROUND OF THE INVENTION

This invention relates generally to adjustable mounting systems, and specifically to an adjustable mount for precision part manufacturing. In particular, the invention concerns an adjustable leveling mount for precision machining, finishing, inspection and measurement of precision manufacture parts and workpieces with complex surface geometry, including vane and blade airfoils for gas turbine engines.

Manufacturing techniques are continuously evolving, particularly in low-tolerance applications for precision manufacture. Even the most advanced techniques remain limited, however, by workpiece positioning, which must be as precise and accurate as the manufacturing process itself in order to reach nominal design tolerances and achieve desired product quality goals.

Complex-geometry workpieces pose particular challenges. In airfoil manufacture for gas turbine engine blades and vanes, for example, individual workpieces must be precisely positioned with respect to a number of different airfoil, platform and shroud or blade tip surfaces. The geometries of these surfaces often vary from individual airfoil to airfoil, moreover, even within a particular turbine or compressor design.

Previous manufacturing techniques have addressed this need with a variety of different mounting systems, including a range of standard vise mounts and individual ball joint mounts. Each of these devices has limitations, however, including inadequate precision and accuracy, insufficient degrees of freedom in motion, and the inability to support heavier workpiece configurations without tipping or dropping.

More advanced mounting systems have been produced, for instance by custom-designing the mount to fit a particular part with a stereo lithography apparatus (SLA) or via selective laser sintering (SLS) methods. SLA design costs can reach $1,500 to $2,000, however, with production times of six to eight weeks, and these custom-designed mounts do not accommodate a range of different airfoil configurations. In addition, SLA and SLS-based systems often require mechanical mounting structures that partially obscure the airfoil, preventing access for machining, surface finishing and measurement.

Ad-hoc positioning methods such as lead bags and memory foam arrangements are also used, but these are time consuming and difficult to standardize. As a result, final product quality varies depending upon individual operator skill and experience. There remains a need, therefore, for a flexible and adaptable mounting system that provides precise, accurate, and cost-effective solutions for a range of different low-tolerance and complex-geometry workpieces, including, but not limited to, vane and blade airfoils for gas turbine engines.

BRIEF SUMMARY OF THE INVENTION

This invention concerns a leveling system for a workpiece. The system comprises an adjustable vise and a multimember support structure. The multimember support structure comprises a first joint (a vise joint), an adjustable arm, a counterweight base, and a second joint (a base joint).

The vise adjusts to hold a variety of different workpiece configurations. The vise joint orients the adjustable vise with respect to three degrees of freedom in angular motion, providing independent control of the vise's axis angle, attitude angle and rotation angle. The adjustable arm supports the vise joint and the adjustable vise above a work surface without dropping, for a range of different workpiece masses. The base supports the base joint and the arm. The second joint orients the arm in zenith and azimuth angles, providing fourth and fifth degrees of freedom in angular motion. The leveling system positions the workpiece with sufficient precision to accommodate low-tolerance manufacturing steps.

DETAILED DESCRIPTION

Figure 1:
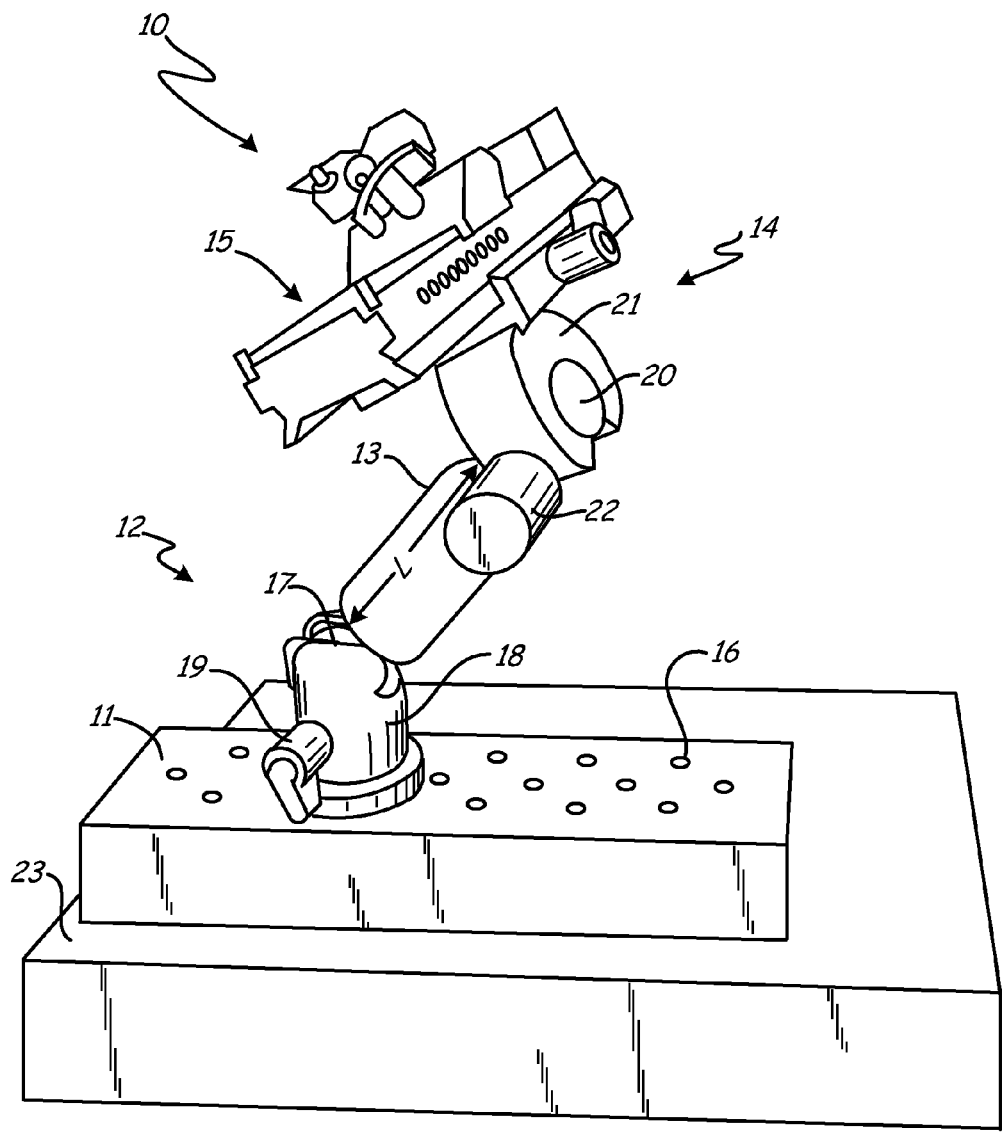
FIG. 1 is a perspective view of an adjustable leveling mount.

FIG. 1 is a perspective view of adjustable leveling mount 10. Mount 10 includes a multimember support structure comprising counterweight base 11, arm joint 12, adjustable arm 13 and vise joint 14. The multimember support structure supports adjustable leveling vise 15.

Counterweight base 11 is comprised of a dense material such as a metal, a dense plastic, a dense resin or other dense filler, or a combination of such materials. Typically, counterweight base 11 comprises mechanical coupling elements such as screw holes 16 for mechanically coupling (attaching) base joint 12 to counterweight base 11.

Base joint 12 comprises a means for orienting adjustable arm 13 with respect to counterweight base 11. Base joint 12 also supports adjustable arm 13 without tipping or dropping, regardless of the position of adjustable arm 13, vise joint 14 and adjustable vise 15.

As shown in FIG. 1, base joint 12 comprises a ball-and-socket joint, which in turn comprises ball 17, rotating socket 18 and socket screw (base joint screw) 19. In other embodiments, base joint 12 comprises an alternate joint means for positioning and supporting adjustable arm 13, such as a universal joint, a ball-and-collar joint, a ball-and-rotator cuff joint, or another alternate joint configuration.

The components of base joint 12 are typically formed of one or more strong durable metals such as iron, steel, stainless steel, copper, brass, aluminum, titanium, or alloys thereof. Alternatively, the components of base joint 12 are formed of a durable polymer materials such as plastics, or a combination of metals and durable polymer materials.

Adjustable arm (or spacing bar) 13 comprises a spacing arm, spacing bar, rod, beam or other structural means to support vise joint 14 in a particular position with respect to counterweight base 11, as determined by base joint 12. Adjustable arm 13 is typically formed of a strong durable metal or polymer material, such as the materials used to form base joint 12, or a composite material such as fiberglass or a carbon-based graphite fiber material. In one embodiment, adjustable arm 13 is of solid construction. Alternatively, adjustable arm 13 has a hollow construction, such as a hollow tubular construction.

Length L of arm 13 is measured between ball 17 of base joint 13 and ball 20 of vise joint 14. In one embodiment, arm length L is between about ten centimeters and about fifty centimeters (10-50 cm), or about four to twenty inches (4-20"). In other embodiments, arm length L is between about ten centimeters and about twenty centimeters (10-20 cm). In further embodiments the arm length varies, typically scaling with the dimensions of the particular workpiece held by adjustable leveling vise 15.

As shown in FIG. 1, vise joint 14 comprises a ball-and-collar joint with ball 20, collar 21 and collar screw 22. Vise joint 14 is configured to orient adjustable vise 15 with respect to arm 13. The components of vise joint 14 have analogous functions to those of base joint 12, and are typically formed of similar materials, but vise joint 14 typically provides additional degrees of freedom in motion.

Adjustable leveling vise 15 is configured to hold or securing a variety of different workpieces, and to leveling or orient the workpieces during machining, finishing, inspection, or other precision manufacturing step. Adjustable leveling vise 15 is described in more detail with respect to FIG. 3, below.

In construction of precision mount system 10, base joint 12 is secured to counterweight base 11 via bolts, pins, or other mechanical attachments to screw holes 16. Adjustable arm 13 is attached to base joint 12, for example by screwing a first end of adjustable arm 13 into a threaded screw hole provided on ball 17. Vise joint 14 is attached to a second (opposing) end of adjustable arm 13, for example via a similar threaded attachment to ball 20. Adjustable leveling vise 15 is mechanically fastened to vise joint 14, typically at collar 21.

Counterweight base 11 is typically capable of hand manipulation by carrying, sliding or other manual action, in order to position mount 10 with respect to work surface 23. Typically, work surface 23 is a substantially horizontal and planar surface such as a floor, workbench or work table, as shown in FIG. 1. In these embodiments, counterweight base 11 typically has sufficient mass to prevent tipping of mount 10 at all possible orientations of base joint 12, adjustable arm 13, arm joint 14 and adjustable leveling vise 15.

In alternate embodiments, counterweight base 11 is configured for mechanical fastening in a particular position on work surface 23, using bolts, screws, clamps, mounting clips, or a magnetic or vacuum mounting system. In these embodiments, work surface 23 is not limited to substantially horizontal and planar surfaces, but also includes slanted surfaces, substantially vertical surfaces and non-planar surfaces, including, but not limited to, walls, ramps, beams, posts, railings and other structural features capable of mechanical attachment to base 11.

Adjustable arm 13 spaces vise joint 14 at a particular distance (or length) from base joint 12. In some embodiments, arm 13 is adjustable in position only, and not adjustable in length. In other embodiments, arm 13 is adjustable in both position and in length.

In adjustable length embodiments, arm 13 typically comprises a number of interchangeable structures of different discrete lengths, which are exchanged in order to adjust the length of arm 13 between base joint 12 and vise joint 14. In discretely adjustable embodiments, the interchangeable structures are sometimes further configured to be combined by screwing together or similar mechanical attachment, providing an additional range of discrete length options.

Alternatively, arm 13 has a continuously adjustable length that is adjusted by sliding or otherwise extending or collapsing a composite arm structure such as a telescoping rod with a friction or compression fitting to fix the length at a particular value. Alternatively, adjustable arm 13 is pneumatically or hydraulically actuated, such that the length is adjusted in response to a fluid pressure.

Base joint 12 supports adjustable arm 13 in a particular orientation with respect to counterweight base 11, with base joint clamp screw 19 providing a frictional force to hold (or clamp) base joint 12 firmly in place, supporting adjustable arm 13 at any allowed position. Similarly, vise joint clamp screw 22 clamps vise joint 14 in place, supporting adjustable leveling vise 15 at any physically allowed orientation.

Base joint clamp screw 19 and vise joint clamp screw 22 typically comprise screws, nuts, bolts or other hand-operated mechanical devices that impose frictional static forces on base joint 12 and vise joint 14. As shown in FIG. 1, for example, screw 19 provides a frictional force by compressing socket 18 against ball 17 of base joint 12, and screw 22 provides an analogous frictional force by compressing collar 21 against ball 20 of vise joint 14.

In alternate embodiments, joint screws 19 and 22 represent pneumatic or hydraulic devices that are actuated in response to a fluid pressure, using an actuator such as a switch, button, foot switch or pedal. In some of these embodiments, base joint 12 and vise joint 14 are actuated at the same time, by the same mechanism, and in other embodiments base joint 12 and vise joint 14 are independently actuated.

Figure 2:
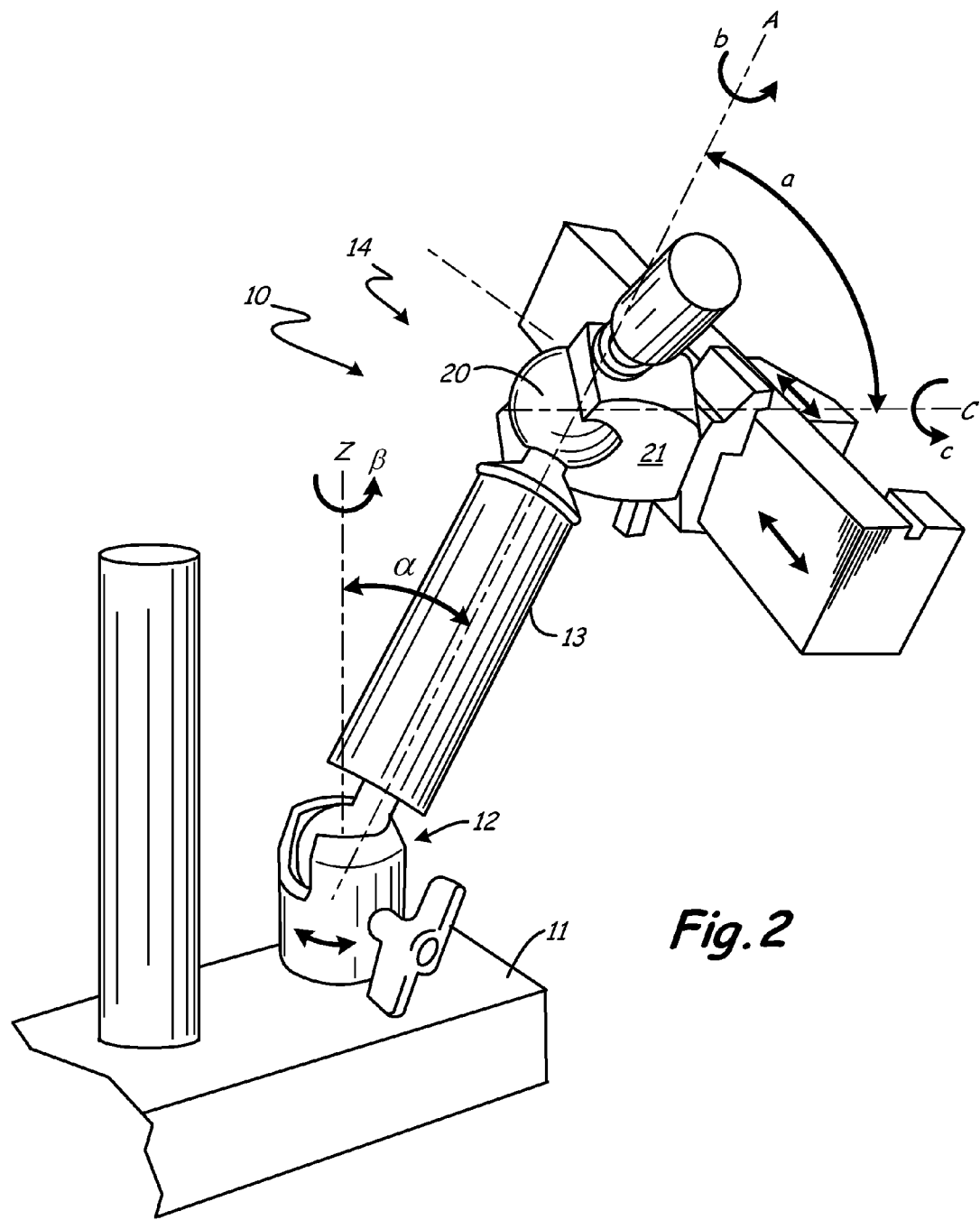
FIG. 2 is an alternate perspective view of the mount in FIG. 1, showing degrees of freedom in motion.

FIG. 2 is an alternate perspective view of adjustable mount 10, showing degrees of freedom in motion. Specifically, FIG. 2 illustrates the degrees of freedom in motion for base joint 12 and vise joint 14.

Base joint 12 provides coarse or large-scale positioning of adjustable leveling mount 20 by allowing adjustable arm 13 to be oriented with respect to counterweight base 11. In the particular embodiment of FIG. 2, base joint 12 provides two degrees of freedom in movement, corresponding to zenith angle $\alpha$ and azimuth angle $\beta$.

Zenith Z is oriented substantially perpendicular to counterweight base 11, and zenith angle $\alpha$ has a minimum range of zero to ninety degrees (0-90°), as measured from the zenith toward the base. In some systems, zenith Z is substantially vertical, and angle $\alpha$ is also referred to as a declination angle. This reflects the fact that the zenith angle is essentially complementary to the elevation or altitude angle, which is measured up from the horizontal, as opposed to down from the vertical toward the horizontal. In other systems, however, zenith Z has a horizontal orientation rather than a vertical orientation, or an arbitrary orientation.

Azimuth angle $\beta$ has a full range of three hundred sixty degrees (360°), as measured in a counter-clockwise sense about zenith direction Z (as seen from above in FIG. 2). Alternatively, the azimuth angle can measured in a clockwise sense, but there is no strictly observed convention and in any case the distinction is arbitrary.

A minimum range of 0-90° in elevation angle $\alpha$ and 360° in azimuth angle $\beta$ allows base joint 13 and base joint clamp screw 19 to position arm 14 in essentially any angular orientation above the plane of counterweight base 12. In some embodiments, base joint 12 also allows arm 13 to depress through an extended range of 90-120°, which corresponds to the region below the center of ball 17. Typically, this range extends until one or more elements of adjustable leveling mount 10 impacts the work surface or another structure, such as counterweight base 11 or a machine tool for use in precision manufacturing. In further embodiments, base joint 12 allows ball 17 and arm 13 to "over-rotate" past zenith Z by approximately 30°.

Vise joint 14 provides fine or small-scale positioning and orientation of adjustable leveling mount 10 by allowing adjustable vise 15 to be oriented with respect to adjustable arm 13. Vise joint 14 is configured for orientations with three independent degrees of freedom in angular motion, rather than the two degrees of freedom provided by base joint 12. As shown in FIG. 2, the three angular degrees of freedom correspond to axis angle a, attitude angle b, and rotation angle c.

Axis angle a is measured from arm axis A to vise axis C, which extends perpendicularly through adjustable leveling vise 15 and bed 32, and diametrically through ball 20 of vise joint 14. Thus axis angle a has a similar sense to that of zenith angle $\alpha$, as measured from zenith Z for base joint 12.

In principle, axis angle a has a greater range of motion than zenith angle $\alpha$, in that adjustable leveling vise 15 is free to depress below the height of vise joint 14 without necessarily striking the work surface (or counterweight base 11). Typically, for example, axis angle a ranges from approximately zero to approximately 135°, which corresponds to a restricted region of about 45° (90° total) in either direction from adjustable arm 12.

Attitude angle b is measured counter-clockwise about arm axis A, analogously to azimuth angle $\beta$ as measured about zenith Z. Rotation angle c is measured about vise axis C. Vise joint 14 typically has a full 360° range of motion in attitude angle b and rotation angle c.

Two points are relevant with respect to allowed orientations of base joint 12 and vise joint 14. First, the angular ranges described herein are nominal or inherent ranges of motion, which describe the structure of joints 12 and 14 in isolation. In practice, however, some orientations are not attainable, because the components of mounting system 10 sometimes impact one another, particularly when attitude angle a increases beyond 90°. Thus the effective range of motion is limited somewhat with respect to the nominal or inherent (maximum) range of motion.

Second, adjustable leveling mount 10 is an under-constrained system. That is, for any particular position or orientation of adjustable leveling vise 15, there are typically a number of different angular "solutions" for $\alpha$, $\beta$, a, b, and c, corresponding to a range of different positions and orientations for joints 12 and 14, and, in some embodiments, a range of different values for length L of arm 13). In fact, for typical positions and orientations there will be an infinite number of such solutions.

The fact that joints 12 and 14 are under-constrained significantly increases mounting and leveling flexibility, and decreases the potential impact of the effective (limited) range of motion, as opposed to the nominal or inherent (maximum) range of motion. For example, at some axis angles a and attitude angles b, a certain range of rotation angle c is sometimes unattainable due to the impact of vise joint collar 21 on adjustable arm 13. Nonetheless, the desired orientation can sometimes be attained by increasing or decreasing zenith angle $\alpha$ at base joint 12, which affects the relationship between collar 21 and ball 20 of vise joint 14. In some embodiments, arm length L can also be adjusted. Alternatively, it is also possible to move base 11 with base joint 12, and then adjust vise joint 14 and vise 15 to obtain a given position or orientation.

In typical embodiments, mount 10 is configured for hand positioning (manual manipulation) of workpiece 11. This distinguishes from larger-scale manufacturing systems such as robotic arms for motor vehicle assembly and other larger-scale assembly systems, which require electromechanical, hydraulic, pneumatic or other non-manual means of positioning and support. In alternate embodiments, however, some elements of mounting system 10 comprise mechanical, pneumatic or hydraulic actuators, such as joints 12 and 14, or adjustable arm 13. In these alternate embodiments, mount 10 positions, orients and levels workpiece 31 via a combination of manual and mechanical means.

Figure 3:
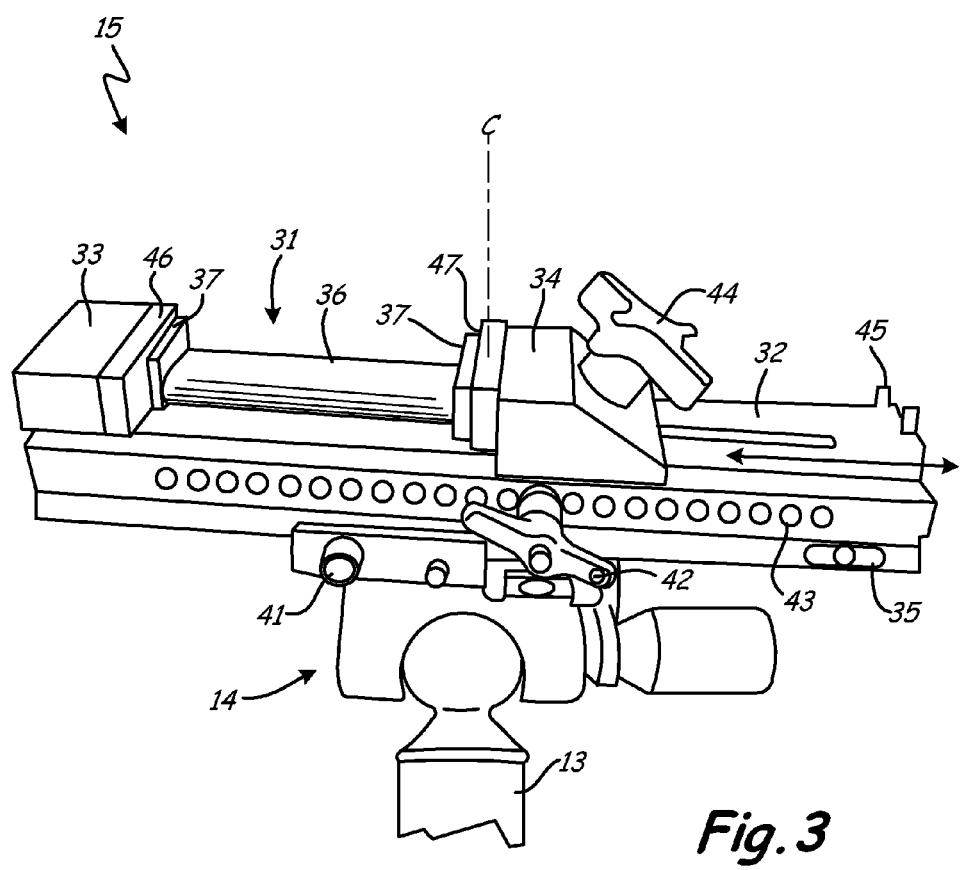
FIG. 3 is a perspective view of an adjustable leveling vise for the mount in FIG. 1, holding a workpiece.

FIG. 3 is a perspective view of adjustable leveling vise 15 holding workpiece 31. Vise 15 comprises bed 32, first jaw 33 and second jaw 34. In some applications, leveling vise also comprises one or more leveling devices 35.

In some examples, workpiece 31 comprises a gas turbine engine part such as an airfoil, a shaft or spool component, a combustor or plenum component, or a seal or bearing component. In other applications, workpiece 31 represents a general-purpose precision element for an electronic or electromechanical device, a micromechanical device, or a process control device, a jewelry item, or another object that requires precision leveling for manufacture, machining, finishing, coating, or measurement and inspection purposes.

Depending upon application, workpiece 31 is typically comprised of a metal, a metal alloy, a superalloy, a semiconductor, a plastic or other durable polymer material, a composite material such as fiberglass or graphite fiber material, or a combination thereof. In some applications workpiece 31 is a unitary structure, and in other applications workpiece 31 comprises a number of distinct elements, such as discrete electronic components or airfoil surfaces. In further examples, workpiece 31 comprises an insulating or protective coating such as a conformal coating, a metal oxide coating, a ceramic coating or an MCrAlY coating, where M is Ni, Co or Fe.

As shown in FIG. 3, workpiece 31 comprises a blade or vane airfoil for the compressor or turbine section of a rotary gas turbine engine. In this example, workpiece 31 comprises airfoil surface 36 and platform or shroud surfaces 37. Alternatively, in unshrouded examples, workpiece 31 comprises an airfoil tip surface or blade tip surface.

In airfoil applications, workpiece 31 typically has maximum linear dimensions on the order of fifty centimeters to one meter (50 cm-1 m) in length (about two to four feet), thirty centimeters (30 cm) in width (about a foot), and ten centimeters (10 cm) in thickness (about two to five inches). In these applications, workpiece 31 typically has a maximum mass on the order of ten to fifteen kilograms (10-15 kg), which corresponds to a maximum weight of about twenty-five to thirty pounds.

Bed 32 is supports first jaw 33 and second jaw 34, which is opposed to first jaw 33. Bed 32 and jaws 33, 34 are typically formed of a strong, durable material such steel, brass, aluminum, or a durable polymer, or a combination of such materials.

In some embodiments, bed 32 is fixed in position with respect to vise 15. In other embodiments, bed 32 is configured to translate or slide forward and backward along translational axis S, which extends longitudinally along the bed 31, perpendicular to vise axis C and across opposing jaws 34 and 35. This allows adjustable vise 15 to position bed 32 and workpiece 31 in a lateral direction, as measured with respect to arm 13 and vise joint 14.

Bed 32 is typically configured to translate along axis S for a distance of at least one-half the length of bed 32, up to about seventy-five to eighty percent of the bed length. In the particular embodiment of FIG. 3, sliding bed 32 is translated by loosing set screw 41, sliding or translating bed 32 along axis S, then re-tightening set screw 41 to fix bed 32 in place. Alternatively, bed 32 is translated by a mechanical actuator such as a machine screw.

Typically, first jaw 33 is fixed, and second jaw 34 is an adjustable jaw that moves along bed 32 in order to accommodate workpieces 31 of various dimensions. Adjustable jaw 34 is typically configured to move along the same translational axis (S) as bed 32, with range of motion that extends over eighty percent of the bed length, as limited by fixed jaw 33 on one side of the bed, and jaw stops 43 on the other side of the bed.

In the particular embodiment of FIG. 3, the large-scale or gross position of jaw 34 is adjusted by moving or sliding adjustable jaw 34 along bed 32, then inserting set pin 42 into one of set holes 43. The small-scale or fine position of jaw 34 is adjusted via jaw screw 44 in order to accommodate a precise linear dimension of workpiece 31. In alternate embodiments, adjustable jaw 34 is moved along translational axis S via an alternate mechanism, such as a machine screw, a spring-loaded adjustable jaw mechanism, or a pneumatic or hydraulic mechanism.

Fixed jaw 34 and adjustable jaw 35 comprise jaw seat 46 and 47. When jaw screw 42 is turned, opposing jaws 34 and 35 tighten seats 46 and 47 against workpiece 31, forming a compressive coupling to hold workpiece 31 in place.

Typically, jaw seats 46 and 47 are comprised of a durable elastic polymer material such as rubber or another resilient polymer. In these embodiments, jaw seats 42 and 43 form the compressing coupling to workpiece 31 without metal-to-metal or metal-on-metal contact, reducing the potential for denting, scratching and other damage. Alternatively, seats 46 and 47 are formed of the same material as jaws 34 and 35. In these embodiments, seats 46 and 47 are sometimes integrally formed with jaws 34 and 35, such that seats 46 and 47 are formed as opposing faces or opposing surfaces on opposing jaws 34 and 35.

In the embodiment of FIG. 3, seats 46 and 47 provide generally planar surfaces configured to form the compressive coupling with platform and shroud surfaces 37 of workpiece 31. In alternate embodiments, seats 46 and 47 provide non-planar surfaces for coupling with airfoil tip surfaces or other non-planar surfaces on workpiece 31. The compressive fitting is formed with sufficient strength to hold workpiece 31 in place, regardless of the orientation of vise 15, for maximum workpiece masses of at least ten to fifteen kilograms (10-15 kg), or twenty-five to thirty pounds (25-30 lb).

Seats 46 and 47 also allow adjustable jaw 15 to hold workpiece 31 in place without obscuring or covering the workpiece, providing access to the entire major exposed surface for machining, inspection, or other manufacturing process. This allows additional areas of interest on workpiece 31 to be addressed in a single step or single series of steps, without removing and then remounting the workpiece on vise 15.

Leveling device 35 comprises a mechanical leveling device such as a bubble levels, or an electronic or electromechanical leveling device such as a laser level. Leveling device 35 allows the orientation of bed 32 to be determined with respect to local (gravitational) down, or with respect to a work surface, a machining or finishing plane, or a measurement plane. Typically, mount system 10 comprises two leveling devices 35, in order to level adjustable vise 15 along two independent axes, such as translational axis S and another (perpendicular) axis along the surface of bed 32. Alternatively, mount system 10 comprises one leveling device, or none. In these latter embodiments, leveling of adjustable vise 15 is sometimes determined by eye, by alignment with an alternate reference such as a straight edge, or by a combination of methods.

In order to accommodate workpieces 31 with complex geometry, leveling devices 35 are typically removable. In this embodiment, leveling devices 35 can be positioned directly on workpiece 31, in order to level one or more surfaces of workpiece 31 independently of bed 32. Thus the term "level" and "leveling" are broadly construed, to incorporate any particular position or orientation of either adjustable vise bed 32 or part 31. Thus "leveling" includes substantially horizontal orientations and positions, substantially vertical orientations and positions, and other more general orientations and positions, which are defined in terms of the appropriate position and orientation for a particular manufacturing step, rather than in any absolute sense of "up" and "down."

Figure 4:
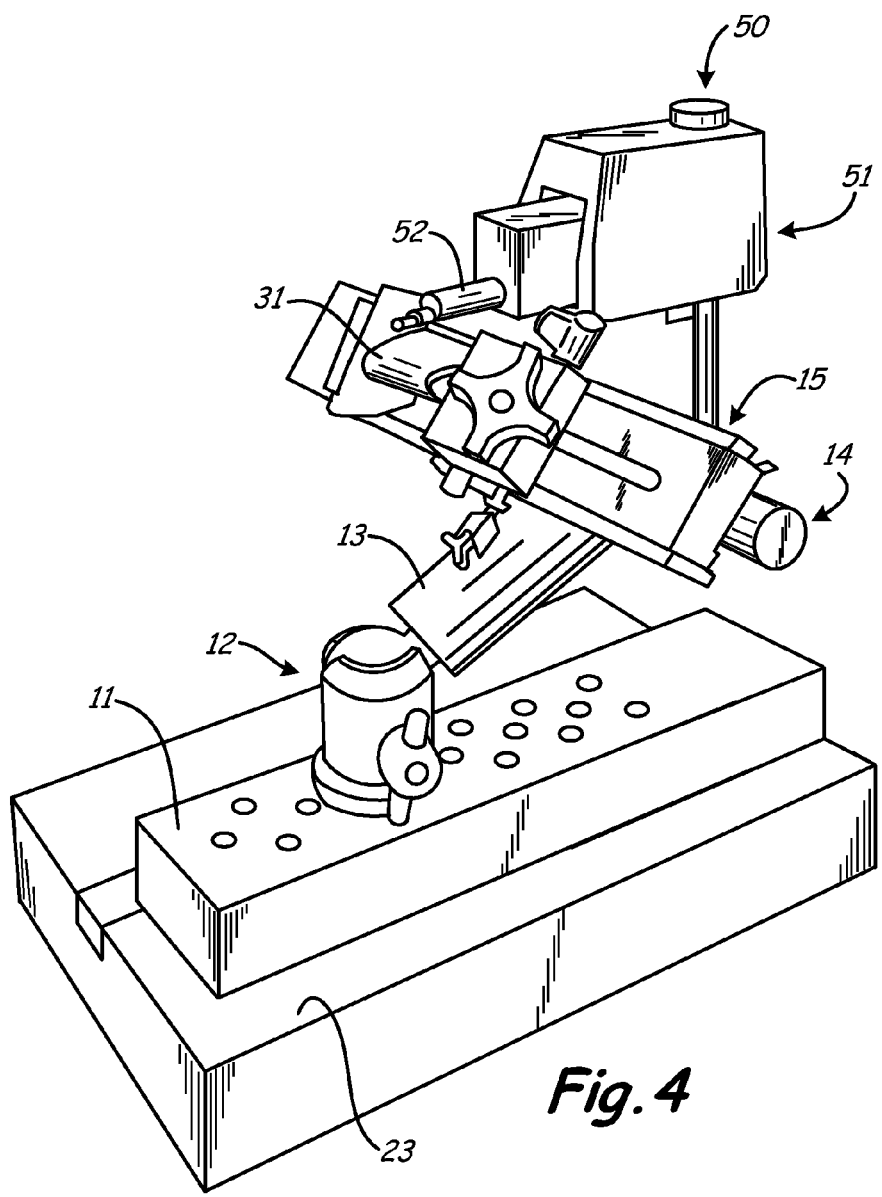
FIG. 4 is another alternate perspective view of the adjustable leveling mount in FIG. 1, holding the workpiece for a precision manufacture step.

FIG. 4 is another alternate perspective view of adjustable leveling mount 10, holding workpiece 31 for a precision manufacture step. Mount 10 comprises counterweight base 11, base joint 12, adjustable arm 13, vise joint 14 and adjustable leveling vise 15, as described above. As shown in FIG. 4, workpiece 31 is a vane or blade airfoil for a gas turbine engine.

Mount 10 positions workpiece 31 for access by machine tool 40. In the particular example of FIG. 4, device 40 is a roughness inspection or other surface measurement device, comprising housing 51, actuator 52 and probe 53. In other examples, machine tool 40 comprises an alternate manufacturing device for machining, milling, coating, surface finishing, or to perform another manufacturing step on workpiece 31.

FIG. 4 illustrates a number of advantages of mount 10 over previous designs. Because mount 10 is under-constrained, it provides more degrees of freedom in motion than are required to provide any particular position or orientation for adjustable leveling vise 15. This provides a range of different positioning solutions for workpiece 31, allowing mounting system 10 to accommodate a wide range of different configurations for machine tool 40.

In addition, base joint 12 and vise joint 14 provide independent degrees of freedom in motion with respect to each other, and with respect to adjustable vise 15. This allows for a simple step-by-step procedure for precise positioning and orientation of workpiece 31 with respect to machine tool 40, without requiring repeated iterations of large-scale and small-scale position adjustments. In particular, base 11 can be placed with respect to work surface 23, followed by coarse or large-scale positioning of arm 13 via base joint 12. This is followed by fine orientation of adjustable vise 15 via vise joint 14. Workpiece 31 is mountable onto adjustable vise 15 at any point in this process, then moved into final position for the manufacturing process by translating (if necessary) along the vise bed.

Mounting system 10 levels, positions and orients workpiece 31 with sufficient precision for manufacturing, measurement and inspection steps having a tolerance of less than about one mil (one thousandth of an inch), or less than about twenty-five microns (25 μm). In some embodiments, system 10 levels, positions and orients workpiece 31 with sufficient precision for manufacturing tolerances of less than a fraction or a mil, or less than about ten microns (10 μm).

In contrast to previous designs, adjustable vise 15 accommodates workpieces with a large range of lineal dimensions, and joints 12 and 14 provide sufficient static forces on arm 13 and vise 15 to support workpieces with masses of up to 10-15 kg (about 25-30 lb). Mount 10 also allows similar workpieces to be swapped in and out while adjustable vise 15 retains the same position and orientation. This contrasts with ad-hoc system such as lead bag and memory foam systems, in which each workpiece must be individually oriented and leveled. It also contrasts with prior art systems that require moving the workpiece holder (i.e., adjustable vise 15) in order to swap workpieces, and so required subsequent re-leveling for the new workpiece. Mount 10 thus facilitates reduced manufacturing time, and improves uniformity of the manufacturing process.

In contrast to previous SLA and SLS-type mounting systems, and other systems with fewer degrees of freedom, mount 10 also allows different surfaces to independently leveled and oriented via fine adjustments of vise joint 12 and vise 15, without requiring lager-scale adjustments of base vise 12 and arm 13. This is particularly advantageous, for example, when applied to airfoil surfaces with substantial twist or other spanwise surface variations. In contrast to prior systems, that is, mount 10 does not require restarting the entire leveling process in order to scan or machine a different location on the workpiece.

The present invention has been described with reference to preferred embodiments. The terminology used is for the purposes of description, not limitation, and workers skilled in the art will recognize that changes may be made in form and detail without departing from the spirit and scope of the invention.

The invention claimed is:

1. A leveling system for a workpiece, the system comprising:
  a vise for holding the workpiece; and
  a multimember support structure for positioning the vise and leveling the workpiece, wherein the multimember support structure comprises:
    a base;
    a first joint coupled to the base;
    an arm coupled to the first joint at a first end of the arm; and
    a second joint coupled to the vise and coupled to the arm at a second end of the arm;
  wherein the first joint orients the arm with two independent degrees of freedom in zenith angle and azimuth angle and the second joint orients the vise with three independent degrees of freedom in angular motion, the three independent degrees of freedom in angular motion comprising a first rotational angle measured about an arm axis of the arm, a second rotational angle measured about a vise axis of the vise and an axial angle measured from the arm axis to the vise axis, such that the multimember support structure provides at least five independent degrees of freedom in angular motion for positioning the vise and leveling the workpiece.

2. The system of claim 1, wherein the vise holds the workpiece in opposing jaws having elastic polymer seats that form a compressive coupling with the workpiece, without metal-to-metal contact.

3. The system of claim 2, wherein the opposing jaws are configured to hold the workpiece along a maximum linear dimension in excess of about twenty-five centimeters and the elastic polymer seats form the compressive coupling with sufficient strength to support a mass in excess of about ten kilograms, and wherein the base slides to position the multimember support structure on a work surface and has sufficient mass to prevent tipping of the multimember support structure at all possible orientations of the first joint, the arm, the second joint and the vise.

4. The system of claim 3, wherein the vise further translates the workpiece along a lateral direction with respect to the second joint.

5. The mount of claim 3, further comprising a leveling device for leveling a bed of the vise with sufficient precision for measuring twist in a spanwise direction along an airfoil with tolerance of less than about ten microns.

6. The system of claim 1, wherein the five independent degrees of freedom comprise a vise rotational angle range of three hundred and sixty degrees provided by the second joint, as measured about a perpendicular axis through a bed of the vise.

7. The system of claim 6, wherein the multimember support structure further positions the vise with an adjustable spacing between the first and second joints in a range of about ten centimeters to about twenty centimeters, as measured along the arm axis of the arm.

8. The system of claim 6, wherein the five independent degrees of freedom further comprise an axial angle range of about one hundred and twenty degrees provided by the second joint, as measured from the arm axis to the perpendicular axis through the bed of the vise.

9. The system of claim 8, wherein the five independent degrees of freedom further comprise an attitude angle range of three hundred and sixty degrees provided by the second joint, as measured about the arm axis.

10. The system of claim 9, wherein the five independent degrees of freedom further comprise a zenith angle range of at least ninety degrees provided by the first joint, as measured from a zenith to the arm axis.

11. The system of claim 10, wherein the five independent degrees of freedom further comprise an azimuth angle range of three hundred and sixty degrees provided by the first joint, as measured about the zenith.

12. The system of claim 11, wherein the first joint and the second joint are independently actuated in response to fluid pressure.

13. An adjustable leveling mount comprising:
  a counterweight base;
  a base joint coupled to the counterweight base;
  a spacing bar coupled to the base joint at a first end of the spacing bar;
  a vise joint coupled to the spacing bar at a second end of the spacing bar; and
  an adjustable vise coupled to the vise joint;
  wherein the vise joint orients the adjustable vise with three independent degrees of angular freedom, the three independent degrees of angular freedom comprising an attitude angle measured about an arm axis along the spacing bar, a rotation angle measured about a vise axis of the vise and an axis angle measured from the arm axis to the vise axis, and the base joint orients the spacing bar with two additional independent degrees of angular freedom in zenith angle and azimuth angle.

14. The mount of claim 13, wherein the adjustable vise comprises a bed, a first jaw and a second opposing jaw, and wherein the second opposing jaw and the bed are independently translatable with respect to the vise joint, along a longitudinal direction defined along the bed.

15. The mount of claim 14, wherein each of the first jaw and the second jaw comprises an elastic polymer seat configured to hold a workpiece without metal-to-metal contact.

16. The mount of claim 13, wherein the vise joint orients the adjustable vise with three independent degrees of angular freedom comprising an axis angle range in excess of ninety degrees from the arm axis along the spacing bar to the vise axis, wherein the vise axis is perpendicular to a bed of the adjustable vise, an attitude angle range of three hundred sixty degrees about the arm axis, and a rotation angle range of three hundred sixty degrees about the vise axis perpendicular to the bed of the adjustable vise.

17. The mount of claim 16, wherein the vise joint comprises a ball coupled to the first end of the spacing bar and a collar that rotates about the ball to orient the adjustable vise in the axis angle, the attitude angle and the rotation angle.

18. The mount of claim 16, wherein the base joint orients the spacing bar with two additional independent degrees of angular freedom comprising a zenith angle range of approximately ninety degrees from a zenith to the arm axis along the spacing bar, and an azimuth angle range of three hundred and sixty degrees about the zenith.

19. The mount of claim 18, wherein the base joint comprises a ball coupled to the second end of the spacing bar and a socket coupled to the counterweight base, such that the ball rotates inside the socket to orient the spacing bar in the zenith angle, and the socket rotates with respect to the base to orient the spacing bar in the azimuth angle.

20. The mount of claim 19, wherein the vise joint and the base joint are activated in response to a fluid pressure.

21. The mount of claim 20, wherein the spacing bar has an adjustable length between about ten centimeters and about fifty centimeters between the base joint and the vise joint.

22. The mount of claim 21, wherein the adjustable length is adjusted in response to a fluid pressure.

23. A precision mount for an airfoil, the mount comprising:
- a vise comprising two opposing jaws to form a compressive coupling that holds the airfoil without metal-to-metal contact, and a sliding bed to translate the airfoil in a longitudinal direction defined across the opposing jaws;
- a vise joint coupled to the vise, wherein the vise joint comprises a ball and a collar that rotates about the ball to orient the vise in independent attitude, axial and rotation angles;
- an arm coupled to the vise joint, wherein the arm comprises an adjustable length rod to support the vise joint and the vise;
- a base joint coupled to the arm at an opposing end from the vise joint, wherein the base joint comprises a ball to rotate the arm in an independent zenith angle and a collar to rotate the arm in an independent azimuth angle; and
- a base coupled to the base joint for supporting the base joint, the arm, the vise joint and the vise;
- wherein the attitude angle is measured about an arm axis of the arm, the rotation angle is measured about a vise axis perpendicular to the sliding bed of the vise, and the axial angle is measured from the arm axis to the vise axis.

24. The mount of claim 23, wherein the vise forms the compressive coupling with an airfoil along a maximum airfoil dimension of at least twenty-five centimeters, the arm supports the vise when holding a maximum airfoil mass of at least ten kilograms, and the base slides to position the mount on a work surface and has sufficient mass to support the arm without tipping at all possible orientations of the base joint and the vise joint.

25. The mount of claim 24, further comprising a leveling device to level the airfoil at different orientations in order to measure twist in a spanwise direction along the airfoil with a tolerance of less than about ten microns.

* * * * *